US007330804B2

(12) United States Patent
Turner et al.

(10) Patent No.: US 7,330,804 B2
(45) Date of Patent: Feb. 12, 2008

(54) COMPUTER METHOD AND APPARATUS FOR CONSTRAINING A NON-LINEAR APPROXIMATOR OF AN EMPIRICAL PROCESS

(75) Inventors: Paul Turner, Mold (GB); John P. Guiver, Saffron Walden (GB); Brian Lines, Houston, TX (US); S. Steven Treiber, Toronto (CA)

(73) Assignee: Aspen Technology, Inc., Burlington, MA (US)

( * ) Notice: Subject to any disclaimer, the term of this patent is extended or adjusted under 35 U.S.C. 154(b) by 757 days.

(21) Appl. No.: 09/892,586

(22) Filed: Jun. 27, 2001

(65) Prior Publication Data
US 2002/0072828 A1 Jun. 13, 2002

Related U.S. Application Data

(60) Provisional application No. 60/214,875, filed on Jun. 29, 2000.

(51) Int. Cl.
*G06F 7/60* (2006.01)
*G06F 17/10* (2006.01)
*G06F 15/18* (2006.01)
*G05B 13/02* (2006.01)
*G06E 1/00* (2006.01)
*G06E 3/00* (2006.01)

(52) U.S. Cl. ............... 703/2; 703/12; 703/13; 700/29; 700/30; 700/31; 700/48; 706/15; 706/16; 706/45

(58) Field of Classification Search ............ 703/2, 703/13, 12; 700/29–31, 48; 706/15–16, 706/21, 23, 45
See application file for complete search history.

(56) References Cited

U.S. PATENT DOCUMENTS 5,311,421 A 5/1994 Nomura et al.
(Continued)

FOREIGN PATENT DOCUMENTS

DE 198 24 433 A1 12/1999
(Continued)

OTHER PUBLICATIONS

Rodic, M. "Torque Trajectory Controller for Induction Motor". Proc. of the IEEE Int'l Symposium on Industrial Electronics, 1999. Jul. 12-16, 199. vol. 2, pp. 641-646.*

(Continued)

*Primary Examiner*—Paul Rodriguez
*Assistant Examiner*—Ayal Sharon
(74) *Attorney, Agent, or Firm*—Hamilton, Brook, Smith & Reynolds, P.C.

(57) ABSTRACT

A constrained non-linear approximator for empirical process control is disclosed. The approximator constrains the behavior of the derivative of a subject empirical model without adversely affecting the ability of the model to represent generic non-linear relationships. There are three stages to developing the constrained non-linear approximator. The first stage is the specification of the general shape of the gain trajectory or base non-linear function which is specified graphically, algebraically or generically and is used as the basis for transfer functions used in the second stage. The second stage of the invention is the interconnection of the transfer functions to allow non-linear approximation. The final stage of the invention is the constrained optimization of the model coefficients such that the general shape of the input/output mappings (and their corresponding derivatives) are conserved.

30 Claims, 3 Drawing Sheets

U.S. PATENT DOCUMENTS

| | | | |
|---|---|---|---|
| 5,377,307 A | 12/1994 | Hoskins et al. | |
| 5,477,444 A * | 12/1995 | Bhat et al. | 700/48 |
| 5,479,573 A | 12/1995 | Keeler et al. | |
| 5,519,605 A | 5/1996 | Cawlfield | |
| 5,559,690 A | 9/1996 | Keeler et al. | |
| 5,675,253 A | 10/1997 | Smith et al. | 324/306 |
| 5,682,309 A | 10/1997 | Bartusiak et al. | |
| 5,687,090 A | 11/1997 | Chen et al. | 364/496 |
| 5,704,011 A | 12/1997 | Hansen et al. | |
| 5,729,661 A | 3/1998 | Keeler et al. | |
| 5,740,033 A | 4/1998 | Wassick et al. | 364/149 |
| 5,809,490 A * | 9/1998 | Guiver et al. | 706/16 |
| 5,847,952 A | 12/1998 | Samad | |
| 5,877,954 A * | 3/1999 | Klimasauskas et al. | 700/29 |
| 5,933,345 A | 8/1999 | Martin et al. | 364/164 |
| 6,047,221 A | 4/2000 | Piche et al. | 700/44 |
| 6,056,781 A | 5/2000 | Wassick et al. | |
| 6,106,785 A | 8/2000 | Havlena et al. | |
| 6,110,214 A * | 8/2000 | Klimasauskas | 703/2 |
| 6,216,048 B1 | 4/2001 | Keeler et al. | |
| 6,246,972 B1 * | 6/2001 | Klimasauskas | 703/2 |
| 6,263,355 B1 | 7/2001 | Harrell et al. | |
| 6,278,962 B1 * | 8/2001 | Klimasauskas et al. | 703/13 |
| 6,314,414 B1 | 11/2001 | Keller et al. | |
| 6,363,289 B1 | 3/2002 | Keeler et al. | |
| 6,373,033 B1 | 4/2002 | de Waard et al. | |
| 6,440,374 B1 | 8/2002 | Jelinek et al. | |
| 6,453,308 B1 * | 9/2002 | Zhao et al. | 706/21 |
| 6,487,459 B1 | 11/2002 | Martin et al. | |
| 6,493,596 B1 | 12/2002 | Martin et al. | |
| 6,594,620 B1 | 7/2003 | Qin et al. | |
| 6,654,649 B2 * | 11/2003 | Treiber et al. | 700/31 |
| 6,816,822 B1 | 11/2004 | Hess et al. | |
| 6,826,521 B1 | 11/2004 | Hess et al. | |
| 6,839,599 B2 | 1/2005 | Martin et al. | |
| 6,862,562 B1 * | 3/2005 | Trieber et al. | 703/12 |
| 6,822,992 B2 | 4/2005 | Werbos | |
| 6,957,203 B2 | 10/2005 | Keeler et al. | |
| 7,065,511 B2 | 6/2006 | Zhao et al. | |
| 7,123,971 B2 * | 10/2006 | Piche | 700/19 |
| 7,149,590 B2 | 12/2006 | Martin et al. | |
| 2001/0025232 A1 * | 9/2001 | Klimasauskas et al. | 703/13 |
| 2002/0103548 A1 * | 8/2002 | Treiber et al. | 700/30 |

FOREIGN PATENT DOCUMENTS

| | | |
|---|---|---|
| WO | WO 97/12300 | 4/1997 |
| WO | WO 99/14642 | 3/1999 |

OTHER PUBLICATIONS

Gibbens, P.W. "Output Feedback Control for Output Tracking of Non-linear Uncertain Systems." Proc of the 30th IEEE Conf. on Decision and Control, Dec. 11-13, 1991. vol. 3, pp. 2509-2514.*

Lightbody, et al. "Neural Network Modelling of a Polymerisation Reactor". Int'l Conf. on Control, Mar. 21-24, 1994 vol. 1, pp. 237-242. (Hereinafter "Lightbody").*

Hahn, K. "Karl's Calculus Tutor—Section 11: Methods of Integration." © 2001. pp. 1-12. http://www.karlscalculus.org/hyper.html.*

Hahn, K. "Inverse Hyperbolic Functions" © 2001. pp. 1-2. http://www.karlscalculus.org/hyper.html.*

Weisstein, Eric W. "Hyperbolic Tangent." From MathWorld. © 1999 CRC Press. http://mathworld.wolfram.com/HyperbolicTangent.html.*

Weisstein, Eric W. "Hyperbolic Cosine." From MathWorld. © CRC Press. http://mathworld.wolfram.com/HyperbolicCosine.html.*

Weisstein, Eric W. "Hyperbolic Functions." From MathWorld. © 1999 CRC Press. http://mathworld.wolfram.com/HyperbolicFunctions.html.*

Weisstein, Eric W. "Inverse Hyperbolic Functions." From MathWorld. © 1999 CRC Press. http://mathworld.wolfram.com/InverseHyperbolicFunctions.html.*

Sloughter, Dan. "Section 6.7: Hyperbolic Functions". Difference Equations to Differential Equations. © 2000. http://math.furman.edu/~dcs/book/c6pdf/sec67.pdf.*

Muliang, Zhong et al. "System Identification Using Neural Networks and Its Application to Plasticating Extruders." Proc. IEEE TENCON '93. Oct. 19-21, 1993. vol. 2, pp. 862-865.*

Wang, X.A. et al. "Artificial Neural Network Model-Based Run-to_run Process Controller." IEEE Transactions on Components, Packaging, and Manuf. Technology. Jan. 1996. vol. 19, Issue 1, pp. 19-26.*

Sentoni, G.B. et al. "Model Reduction for Nonlinear DABNet Models." Proc. of 1999 American Control Conf. Jun. 2-4, 1999. vol. 3, pp. 2052-2056.*

U.S. Copyright Office, Public Catalog entry for IEEE Control Systems Magazine, Serial Publication Year 2000. Printed Sep. 2, 2007.*

IEEE Xplore information sheet for the article by S. Piche et al., "Non-linear Model Predictive Control Using Neural Networks." IEEE Control Systems Magazine, Jun. 2000. Information sheet printed Sep. 1, 2007.*

Thompson, M. and Kramer, M., "Modeling Chemical Processes Using Prior Knowledge and Neural Networks," *AIChE Journal*, vol. 40, p. 1328 (1994).

Henson, M. and Seborg, D., *Nonlinear Process Control*, Prentice Hall (1997), table of contents only.

Piche, S., et al., "Nonlinear Model Predictive Control Using Neural Networks," *IEEE Control Systems Magazine*, vol. 20, pp. 53-62 (2000).

Hornick, K., et al., "Multilayer Feedforward Networks are Universal Approximators," *Neural Networks*, vol. 2, pp. 359-366 (1989).

Duch, W. and Jankowski, N., "Survey of Neural Transfer Functions," *Neural Computing Surveys*, vol. 2, pp. 163-212 (1999).

Moore, R., "Interval Analysis," Prentice-Hall, Inc., 1966.

Cubillos, et al., "Model Predictive Control Based on a Hybrid Neural Model," *Brazilian Journal of Chemical Engineering* 12(4):208-217 (1995).

Gupta, et al., "Hybrid First-Principles/Neural Networks Model for Column Flotation," *AIChE Journal*, 45(3) (1999).

Duch, et al., "Transfer Functions: Hidden Possibilities for Better Neural Networks," Department of Computer Methods, Nicholas Copernicus University, (2001).

Psichogios, et al., "A Hybrid Neural Network-First Principles Approach to Process Modeling," *AIChE Journal* 38(10), (1992).

Information Disclosure Statement dated Jan. 3, 2005 from U.S. Appl. No. 10/842,157.

Office Action dated Jan. 12, 2007 from U.S. Appl. No. 10/842,157.

Reply to Office Action dated Jan. 12, 2007, filed Apr. 9, 2007 for U.S. Appl. No. 10/842,157.

Office Action Made Final dated Jul. 16, 2006 for U.S. Appl. No. 10/842,157.

Piche, S.W., "The Second Derivative of a Recurrent Network." Conference Proceedings IEEE Conference on Neural Networks, IEEE, 0-7803-1901-X94: 245-250 (1994).

Bishop, C., "Exact Calculation of the Hessian Matrix for the Multilayer Perception," *Neural Computation*, 4: 494-501 (1992).

Werbos, P.J., "Forms of Backpropagation for Sensitivity Analysis, Optimization, and Neural Networks." In *The Roots of Backpropagation*, John Wiley & Sons, Inc. eds. (NY: John Wiley & Sons, Inc.) pp. 256-294, (1994).

Hartman, E., "Training Feedforward Neural Networks with Gain Constraints," *Neural Computation*, 12: 811-829 (2000).

Huafang, N., Hunkeler, D., "Prediction of copolymer composition drift using artificial neural networks: copolymerization of acrylamide with quaternary ammonium cationic monomers," *Polymer*, vol. 38, No. 3, pp. 667-675 (Feb. 1997).

Kulawski, G.J., Brdys, M.A., "Stable adaptive control with recurrent networks," *Automatica*, vol. 36, pp. 5-22 (2000).

Lindskog, P., Ljung, L., "Ensuring monotonic gain characteristics in estimated modes by fuzzy model structures," *Automatica*, vol. 36, pp. 311-317 (2000).

Molga, E.J., van Woezik, B.A.A., Westerterp, K.R., "Neural networks for modeling of chemical reaction systems with complex kinetics: oxidation of 2-octanol with nitric acid," *Chemical Engineering and Processing*, vol. 39, No. 4, pp. 323-334 (Jul. 2000).

Neuroth, M., MacConnell, P., Stronach, F., Vamplew, P., "Improved modeling and control of oil and gas transport facility operations using artificial intelligence," *Knowledge Based Systems*, vol. 13, No. 2, pp. 81-92, (Apr. 2000).

Yaser, S., Abu-Mostafa, "Machines that learn from hints," *Scientific American*, pp. 64-69, (Apr. 1995).

Zhang, J., Morris, A.J., Martin, E.B., Kiparissides, C., "Estimation of impurity and fouling in batch polymerisation reactors through application of neural networks," *Computers in Chemical Engineering*, vol. 23, No. 3, pp. 301-314, (Feb. 1999).

\* cited by examiner

COMPUTER METHOD AND APPARATUS FOR CONSTRAINING A NON-LINEAR APPROXIMATOR OF AN EMPIRICAL PROCESS

RELATED APPLICATION

This application claims the benefit of U.S. Provisional Application No. 60/214,875, filed on Jun. 29, 2000. The entire teachings of the above application are incorporated herein by reference.

BACKGROUND OF THE INVENTION

It has been a customary practice for many years to utilize universal approximators such as neural networks when attempting to model complex non-linear, multi-variable functions. Industrial application of such technologies has been particularly prevalent in the area of inferential or soft sensor predictors. For example, see Neuroth, M., MacConnell, P., Stronach, F., Vamplew, P. (April 2000): "Improved modeling and control of oil and gas transport facility operations using artificial intelligence.", Knowledge Based Systems, vol. 13, no. 2, pp. 81-9; and Molga, E. J. van Woezik, B. A. A, Westerterp, K. R.: "Neural networks for modeling of chemical reaction systems with complex kinetics: oxidation of 2-octanol with nitric acid", Chemical Engineering and Processing, July 2000, vol. 39, no. 4, pp. 323-334. Many industrial processes require quality control of properties that are still expensive if not impossible to measure on-line. Inferential quality estimators have been utilized to predict such qualities from easy to measure process variables, such as temperatures, pressures, etc. Often, the complex interactions within a process (particularly in polymer processes) manifest as complex non-linear relationships between the easy to measure variables and the complex quality parameters.

Historically, conventional neural networks (or other generic non-linear approximators) have been used to represent these complex non-linearities. For example, see Zhang, J., Morris, A. J., Martin, E. B., Kiparissides, C.: "Estimation of impurity and fouling in batch polymerization reactors through application of neural networks", Computers in Chemical Engineering, Feb. 1999, vol. 23, no. 3, pp. 301-314; and Huafang, N., Hunkeler, D.: "Prediction of copolymer composition drift using artificial neural networks: copolymerization of acrylamide with quaternary ammonium cationic monomers", Polymer, February 1997, vol. 38, no. 3, pp. 667-675. Historical plant data is used to train the models (i.e., determine the model coefficients), and the objective function for a model is set so as to minimize model error on some arbitrary (but representative) training data set. The algorithms used to train these models focus on model error. Little or no attention is paid to the accuracy of the derivative of the converged function.

This focus on model error (without other considerations) prohibits the use of such paradigms (i.e., conventional neural networks) in closed loop control schemes since the objective of a non-linear model is usually to schedule the gain and lag of the controller. Although jacketing can be used to restrict the models from working in regions of one dimensional extrapolation, the models will be expected to interpolate between operating points. A linear or well behaved non-linear interpolation is therefore required. The gains may not match the actual process exactly but at the very least, the trajectory should be monotonically sympathetic to the general changes in the process gain when moving from one operating point to another.

Work has been undertaken to understand the stability of dynamic conventional neural networks in closed loop control schemes. Kulawski et al. have recently presented an adaptive control technique for non-linear stable plants with unmeasurable states (see Kulawski, G. J., Brydys', M. A.: "Stable adaptive control with recurrent networks", Automatica, 2000, vol. 36, pp. 5-22). The controller takes the form of a non-linear dynamic model used to compute a feedback linearizing controller. The stability of the scheme is shown theoretically. The Kulawski et al. paper emphasizes the importance of monotonic activation functions in the overall stability of the controller. However, the argument is not extended to the case of inappropriate gain estimation in areas of data sparseness.

Universal approximators (e.g., conventional neural networks) cannot guarantee that the derivatives will be well behaved when interpolating between two points. The very nature of these models means that any result could occur in the prediction of the output by the universal approximator in a region of missing or sparse data between two regions of sufficient data. Provided that the final two points on the trajectory fit, then the path between the points is unimportant. One of the key advantages of the present invention is that it uses a priori knowledge of the process gain trajectory (e.g., monotonic gain, bounded gain, etc.) and constrains the estimator to solutions that possess these properties.

The benefits of including a priori knowledge in the construction of non-linear approximators has been cited in many areas. Lindskog et al. discuss the monotonic constraining of fuzzy model structures and applies such an approach to the control of a water heating system (see Lindskog, P, Ljung, L.: "Ensuring monotonic gain characteristics in estimated models by fuzzy model structures", Automatica, 2000, vol. 36, pp. 311-317). Yaser, S. Abu-Mostafa discusses one method of "tempting" a neural network to have localized monotonic characteristics by "inventing" pseudo-training data that possesses the desired non-linear characteristics (see Yaser, S. Abu-Mostafa: "Machines that learn from hints", Scientific American, April 1995, pp. 64 -69). This does not guarantee global adherence to this particular input/output relationship.

Thus, it is well accepted that universal approximators should not be used in extrapolating regions of data. Since they are capable of modeling any non-linearity then any result could occur in regions outside and including the limits of the training data range.

For process control, the constraining of the behavior of an empirical non-linear model (within its input domain) is essential for successful exploitation of non-linear advanced control. Universal approximators, such as conventional neural networks cannot be used in advanced control schemes for gain scheduling without seriously deteriorating the potential control performance.

SUMMARY OF THE INVENTION

The present invention is an alternative that allows the gain trajectory and monotonicity of the non-linear empirical approximator to be controlled. Although not a universal approximator, the ability of the invention to "fit" well behaved functions is competitive with conventional neural networks yet without any of the instabilities that such an approach incurs. The main feature of the invention is to constrain the behavior of the derivative of the empirical model without adversely affecting the ability of the model to represent generic non-linear relationships.

The constrained non-linear approximators described in this invention address the issue of inappropriate gains in areas of data sparseness (e.g., in the training data) and provides a non-linear approximating environment with well behaved derivatives. The general shape of the gain trajectory is specified if required. Alternatively, the trajectory is "learned" during training and later investigated. The key to the present invention is that the constrained behavior of the model derivative is guaranteed across the entire input domain of the model (i.e., the whole range of possible values acceptable as input to the model)—not just the training data region. Thus, the present invention does guarantee a global adherence to the gain trajectory constraints.

One approach that attempts to constrain conventional feedforward neural networks using gain-constrained training is described in Erik Hartmann. "Training Feedforward Neural Networks with Gain Constraints," in *Neural Computation,* 12, 811-829 (2000). In this approach, constraints are set for each input/output for a model having multiple inputs and outputs. The approach of Hartmann does not guarantee that the global behavior of the model will have a constrained global behavior (e.g., across the entire model input domain). In contrast, the approach of the invention insures that the model has a constrained global behavior, as described in more detail herein.

In the preferred embodiment, there are three stages in developing a constrained non-linear approximator for an empirical process. The first stage is the specification of the general shape of the gain trajectory, which results in an initial model of the empirical process. This may be specified graphically, algebraically or generically (learned by the optimizer). The second stage of the invention is the interconnection of transfer (e.g., activation) functions, which allow non-linear approximation in a non-linear network model based on the initial model. The final stage of the invention is the constrained optimization of the model coefficients in an optimized model (i.e., constrained non-linear approximator) based on the non-linear network model, such that the general shape of the input/output mappings (and their corresponding derivatives) are conserved.

These three stages described above form the modeling part of the invention that utilizes the constraining algorithm for generating non-linear (dynamic or steady state) models that possess the desired gain trajectory. The techniques of the invention allow the user (i.e., model designer) to interrogate both the input/output and gain trajectory at random or specific points in the input data domain.

With the model (e.g., optimized non-linear model) built, the user may build a non-linear controller. The controller utilizes the optimized model in its prediction of the optimal trajectory to steady state (e.g., optimal gain trajectory of the desired output to reach a steady state process to produce the desired output). An accurate, non-linear prediction of the controlled variables and the process gains are available from the non-linear optimized model.

In another embodiment of the invention, the invention also allows further modeling (of either raw empirical or empirical/first principles hybrid or alternative hybrid structure) utilizing the gain trajectory constraining algorithm to generate a non-linear model of the process for further process optimization purposes (e.g., non-linear program) in either the interconnection stage or the constrained optimization stage (or both stages). The optimizer then uses this constrained model to identify optimal set points for the non-linear controller.

The invention may be used to model any form of an empirical process to produce a constrained non-linear approximator, where a prior knowledge of underlying system behavior is used to define a constraint on the optimization of the interconnected model of transfer functions (e.g., non-linear network model based on a layered architecture). For example, the techniques of the invention may be applied to, but are not limited to, any chemical or process model, financial forecasting, pattern recognition, retail modeling and batch process modeling.

Thus, the present invention provides a method and apparatus for modeling a non-linear empirical process. In particular, the present invention provides a computer apparatus including a model creator, a model constructor and an optimizer. The model creator creates an initial model generally corresponding to the non-linear empirical process to be modeled. The initial model has an initial input and an initial output. The initial model corresponds generally to the shape of the input/output mapping for the empirical process. Coupled to the model creator is a model constructor for constructing a non-linear network model based on the initial model. The non-linear network model has multiple inputs based on the initial input and a global behavior for the non-linear network model as a whole that conforms generally to the initial output. Coupled to the model constructor is an optimizer for optimizing the non-linear network model based on empirical inputs to produce an optimized model by constraining the global behavior of the non-linear network model. The optimized model provides one example of the constrained non-linear approximator. The resulting optimized model thus provides a global output that conforms to the general shape of the input/output mapping of the initial model, while being constrained so that the global output of the optimized model produces consistent results (e.g., monotonically increasing results) for the whole range of the input domain. The modeling apparatus and method described herein is applicable to any non-linear process.

In accord with another aspect of the invention, the model creator specifies a general shape of a gain trajectory for the non-linear empirical process. The resulting optimized model thus provides a global output that conforms to the general shape of the gain trajectory specified for the initial model.

In another aspect of the invention, the model creator specifies a non-linear transfer function suitable for use in approximating the non-linear empirical process. The non-linear network may include interconnected processing elements, and the model constructor incorporates the non-linear transfer function into at least one processing element. The optimizer may set constraints by taking a bounded derivative of the non-linear transfer function. In a preferred embodiment, the non-linear transfer function includes the log of a hyperbolic cosine function.

In another aspect of the invention, the model constructor constructs the non-linear network model based on a layered network architecture having a feedforward network of nodes with input/output relationships to each other. The feedforward network includes transformation elements. Each transformation element has a non-linear transfer function, a weighted input coefficient and a weighted output coefficient. In this aspect, the optimizer constrains the global behavior of the non-linear network model to a monotonic transformation based on the initial input by pairing the weighted input and output coefficients for each transformation element in a complementary manner to provide the monotonic transformation. The complementary approach is also referred to as "complementarity pairing." Using this approach, the optimizer insures that the global output of the optimized model is constrained to be, for example, monotonically increasing throughout the global output of the optimized model, and over the entire range of input values.

In a further aspect of the invention, the apparatus and method includes an advisory model that represents another model of the non-linear empirical process that is different from the initial model, the non-linear network model, and the optimized model. The optimizer may adjust the optimization of the optimized model based on information provided by the advisory model. The advisory model may be a first principles model of the non-linear empirical process. Thus, data from a first principles approach may be used to inform and influence the optimization process performed by the optimizer.

The non-linear empirical process may also be part of a greater process managed by a controller coupled to the optimizer. In this case, the optimizer communicates the optimized model to the controller for deployment in the controller. Thus the optimized model may be included as one component in some larger model that may use other modeling approaches for other components of the larger model.

The computer apparatus and method described herein thus provide more precise control (or prediction) of the empirical process and a reduction in variance of the output, because the constrained non-linear approximator (e.g., optimized model) provides more consistent and predictable output than traditional universal approximators.

In another aspect, the present invention provides a computer apparatus and method for modeling an industrial process. In particular, a computer apparatus and for modeling a polymer process includes a model creator, a model constructor, and an optimizer. The model creator specifies a base non-linear function for an initial model generally corresponding to the polymer process to be modeled. The initial model includes an initial input and an initial output. The base non-linear function includes a log of a hyperbolic cosine function. Coupled to the model creator is the model constructor for constructing a non-linear network model based on the initial model. The non-linear network model includes the base non-linear function, and has multiple inputs based on the initial input. The global behavior for the non-linear network model as a whole conforms generally to the initial output. Coupled to the model constructor is an optimizer for optimizing the non-linear network model based on empirical inputs to produce an optimized model by constraining the global behavior of the non-linear network model by setting constraints based on taking a bounded derivative of the base non-linear function.

With the inclusion of a suitable function (e.g., the log of a hyperbolic cosine function) the non-linear network model and optimizer use a bounded derivative based on this function to set the constraints for the constrained non-linear approximator (e.g., optimized model). The resulting output global behavior is constrained in a manner generally conforming to the expected behavior for a polymer process throughout the entire input domain of inputs values for the polymer process, without the unpredictable behavior that may occur with universal approximators based on traditional neural network approaches. The apparatus and method of the invention provide a more precise control of a known or ongoing polymer process in an industrial facility, as well as providing more reliable control for a new polymer (or other chemical) product being introduced to the industrial facility. Furthermore, a transfer of a polymer process based on a constrained non-linear approximator may be more easily made to a similar industrial facility than a transfer based on polymer process models produced by conventional modeling techniques.

In general, the greater consistency and control of the constrained non-linear approximator insures a more predictable result for the global behavior of the model for any empirical process being modeled.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
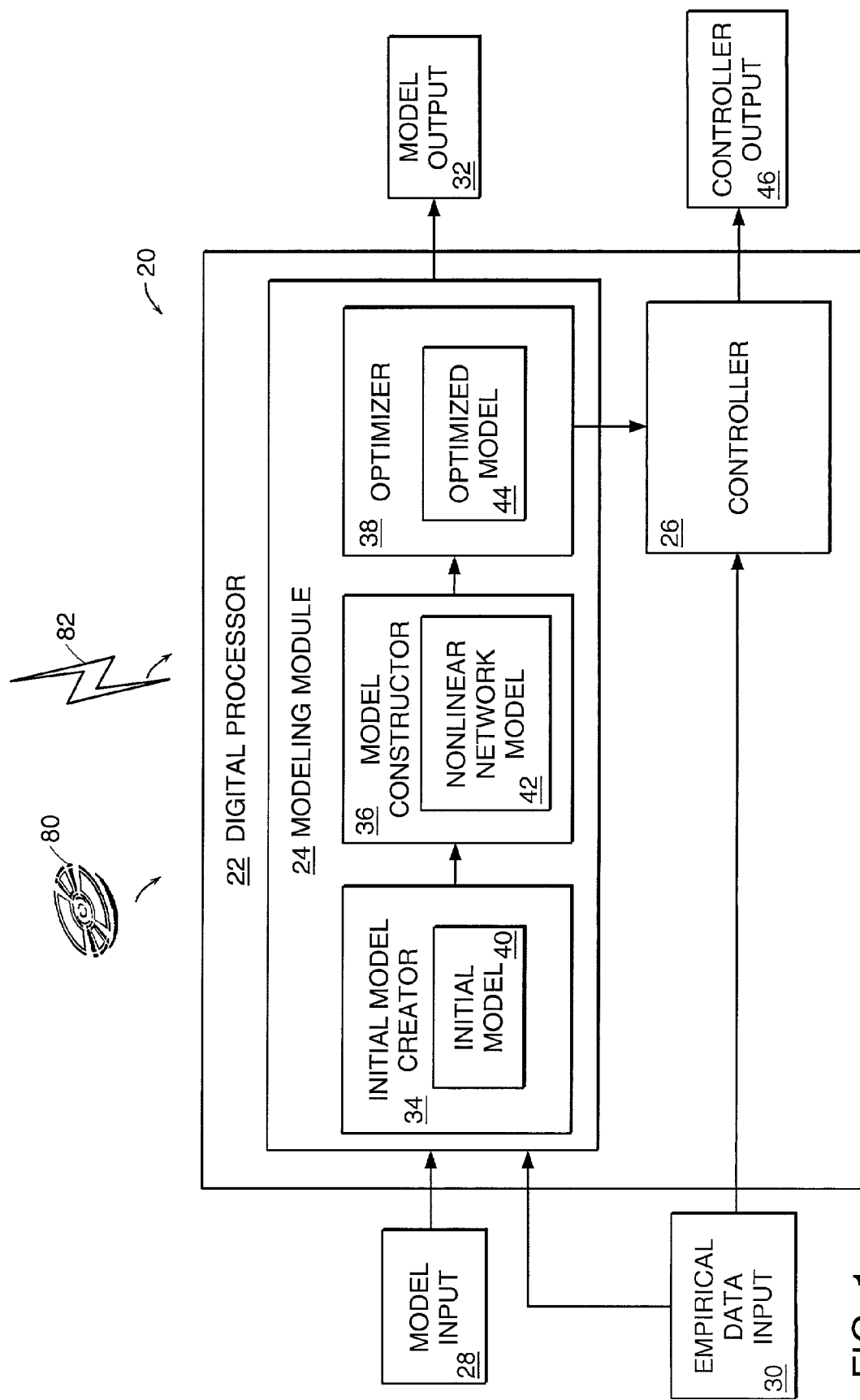
FIG. 1 is a block diagram of a computer implementation of a preferred embodiment of the present invention.

FIG. 1 is a block diagram of a preferred embodiment of the present invention method and apparatus as implemented in a digital processor 22. The illustrated computer apparatus 20 (and method) for constraining a non-linear approximator to model an empirical process is implemented on a digital processor 22, which hosts and executes a modeling module 24 and a controller 26 in working memory, such as RAM (random access memory). The modeling module 24 includes an initial model creator 34, a model constructor 36, and an optimizer 38. The components of the computer system 20 (e.g., controller 26, initial model creator 34, model constructor 36 and optimizer 38) are implemented on the digital processor 22, as shown in FIG. 1, or, in alternate embodiments, implemented in any combination on two or more digital processors in communication with each other in a distributed computing arrangement. In addition, the components 34, 36, and 38 may be implemented in an online environment where the controller 26 and/or other components 34, 36, or 38 interact with the empirical process being modeled or the components 34, 36, and 38 may be implemented in an offline environment.

The initial model 40 specified by a model designer using the initial model creator 34 provides a specification of the general relationship of a single input and single output for the empirical process to be modeled. The initial model 40 is a general (e.g., graphic) shape, a set of data points, a base non-linear function, or other suitable specification of the general input/output relationship for the model. The non-linear network model 42 generated by the model constructor 36 is a model of the empirical process based on the initial model 40 and a suitable modeling architecture, such as an interconnected layer approach, as will be discussed in more detail later. The non-linear network model 42 has multiple inputs based on the initial input of the initial model 40 and a global behavior for the non-linear network model 42 as a whole that conforms generally to the initial output of the initial model 40. The optimized model 44 is an optimized version of the non-linear network model 42 produced by the optimizer 38.

Model input 28 to the modeling module 24 is input from data files, another software program, another computer, input devices (e.g., keyboard, mouse, etch), and the like. Empirical data input 30 to the controller 26 (or to the modeling module 24) is input from sensory devices (e.g., for a manufacturing process), monitoring software (e.g., for stock market prices), another software program, another computer, input devices (e.g., keyboard, mouse, etc.) and the like. Model output 32 is provided to the controller 26, another computer, storage memory, another software program, and/or output devices (e.g., display monitor, etc.). Controller output 46 is provided to actuators (e.g., to control part of a process in a manufacturing plant), an exchange (e.g., to place an order on a stock exchange), another computer, storage memory, another software program, and/or output devices (e.g., display monitor, etc.) and the like. It is to be understood that the computer system 22 may be linked by appropriate links to a local area network, wide area network, global network (e.g., Internet), or similar such networks for sharing or distributing input and output data.

In FIG. 1, the optimizer 38 is preferably an optimizer from the Aspen Open Solvers library of optimizers provided by Aspen Technology, Inc, of Cambridge, Mass. (assignee of the present invention). One such optimizer is DMO/SQP® also of Aspen Technology, Inc. Other non-linear optimizers may be suitable for use with the invention. In a preferred embodiment, the controller is Aspen Apollo, part of the Aspen Advantage Control Suite provided by Aspen Technology, Inc. Another controller 26 suitable for use with the invention is DMC Plus® by Aspen Technology, Inc. In one embodiment, the model constructor 36 is a generator of a non-linear network, such as provided by Aspen IQ™ by Aspen Technology, Inc.

In one embodiment, a computer program product 80, including a computer readable medium (e.g., one or more CDROM's, diskettes, tapes, etc.), provides software instructions for the initial model creator 34, model constructor 36, and/or optimizer 38. The computer program product 80 may be installed by any suitable software installation procedure, as is well known in the art. In another embodiment, the software instructions may also be downloaded over a wireless connection. A computer program propagated signal product 82 embodied on a propagated signal on a propagation medium (e.g., a radio wave, an infrared wave, a laser wave, a sound wave, or an electrical wave propagated over the Internet or other network) provides software instructions for the initial model creator 34, model constructor 36, and/or optimizer 38. In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product 80 is a propagation medium that the computer may receive and read, such as by receiving the propagation medium and identifying a propagated signal embodied in the propagation medium, as described above for the computer program propagated signal product 82.

Figure 2:
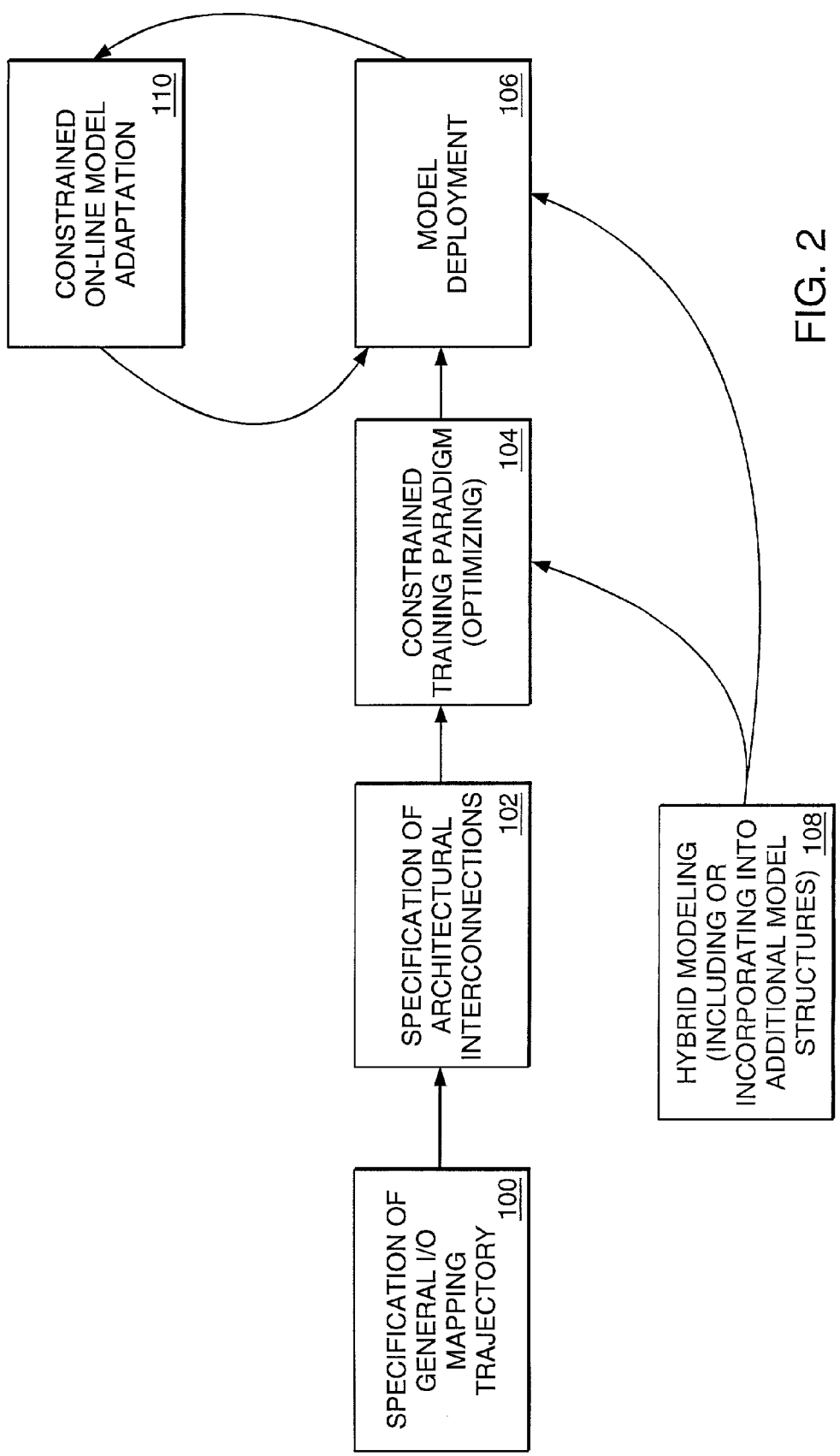
FIG. 2 is a diagram of the stages of developing a constrained non-linear approximator in the preferred embodiment.

Referring now to FIG. 2, which is a diagram of the stages of developing the constrained non-linear approximator in the preferred embodiment. It is to be understood that the stages shown in FIG. 2 are equivalent to steps in a procedure to develop and optimize a non-linear constrained approximator and to provide further online optimization for it.

Stage 100 is the specification of the general I/O mapping trajectory, which represents the output of the initial model 40. A model designer uses the initial model creator 34 to specify the initial model 40 by indicating the general relationship between a single input and a single output (i.e., trajectory). The output or trajectory is intended to represent the behavior of an empirical process (e.g., a physical, chemical, economic, financial or other empirical process) over time. This stage 100 involves the specification of the general shape of the gain trajectory of a chemical process, such as a polymer process. In a polymer process, the gain trajectory represents the trajectory of the output of the polymer process as it progresses from an initial state (e.g., zero output state) to a steady state of polymer production, as in an industrial polymer production facility. The approach of the invention provides more control over the gain trajectory, thus providing a more precise grade transition that increases the percentage of first time in-specification production product.

One implementation of the general I/O mapping stage 100 process is shown in FIG. 1 by the initial model 40, which represents the result of this stage 100. For stage 100, the general I/O mapping is specified graphically, algebraically, or generically (i.e., learned by the optimizer 38). In one approach of using the invention, a model designer uses the initial model creator 34 to draw a graphical shape (i.e., initial model 40) on a display of the computer system 20 that represents a general graphical shape of the gain trajectory based on the designer's knowledge of the process. In another approach, a model designer may provide a table or database of input and output data that specifies a general shape of the I/O mapping for the initial model 40.

Furthermore, the general I/O mapping may be determined by a first principles model based on the basic physical properties of the process. Examples of such first principles modeling systems are provided by assignee Aspen Technology, Inc. of Cambridge, Mass. and are described in commonly assigned U.S. patent applications Ser. No. 09/678,724, entitled "Computer Method and Apparatus for Determining State of Physical Properties in a Chemical Process," now U.S. Pat. No. 6,862,562 to Treiber et al. issued on Mar. 1, 2005, and U.S. patent application Ser. No. 09/730,466, now U.S. Pat. No. 6,654,649 to Treiber et al. issued on Nov. 25, 2003, entitled "Computer Method and Apparatus for Optimized Controller in a Non-Linear Process," both of which are incorporated herein by reference.

In a preferred embodiment, the model designer selects a base non-linear function that provides a general I/O shape that generally corresponds to the expected shape for the empirical process and serves as the initial model 40. For example, the model designer selects a base non-linear function that provides a non-linear monotonically increasing shape, which is suitable for many non-linear empirical processes, such as a polymer process or stock market behavior in response to certain influences (e.g., decreasing interest rates). Such a base non-linear function may be a hyperbolic function, such as a hyperbolic tangent or the log of a hyperbolic cosine, that provides a non-linear generally monotonically increasing shape. As discussed in more detail later, if the model designer selects an appropriate transfer function, such as the log of a hyperbolic cosine, then later stages of the process (i.e., stages 102 and 104) determines a bounded derivative of the base linear function to determine constraints for the constrained training stage 104 (i.e., optimizing stage).

In another embodiment of the invention, in stage 100, the general I/O mapping is determined (i.e., learned) by an optimizer (not necessarily the same optimizer as the optimizer 38 of FIG. 1). For example, an optimizer is used to train a neural network (not to be confused with the non-linear network of the model 42) based on empirical data input 30. The output of the neural network then represents a general shape I/O mapping that serves as the initial model 40. In this case, an optimizer serves as an initial model creator 34, and the neural network serves as the initial model 40.

Stage 102 is the specification of the architectural interconnections of transfer functions to create a non-linear network model 42 of the empirical process. One implementation of the architectural interconnection stage 102 is shown in FIG. 1 by the model constructor 36 which produces the non-linear network model 42 as the result of this stage 102. Stage 102 involves constructing the non-linear network model 42 based on the initial model 40 and setting up constraints for the non-linear network model 42 that the optimizer 38 later uses in the constrained training stage 104 to insure that the model output 32 of the optimized model 44 is within the constraints. In general, the constraints reflect a model designer's knowledge of how the empirical model should behave. In a preferred embodiment, the model designer chooses constraints that insure a monotonically increasing output for the global behavior of the optimized model 44 as a whole (e.g., a polymer process). In other embodiments, the model designer chooses constraints to insure some other behavior, such as monotonically decreasing behavior, or output behavior having a restricted number of turning points (e.g., no more than one turning point). In a further embodiment, some other approach than one based primarily on the model designer's knowledge may be used to determined how the output behavior should be constrained, such as an analysis of an empirical process by a computer program to determine a general I/O mapping for the initial model 40 in stage 100 and appropriate constraints to be set up in stage 102.

In the preferred embodiment of stage 102, a non-linear transfer function is selected based on the base non-linear function (e.g., the non-linear transfer function is the same as the base non-linear function or modified in some way). The model constructor 36 establishes transformation elements and includes a non-linear transfer function in each transformation element. In addition, each transformation element has a weighted input coefficient and a weighted output coefficient. The model constructor 36 then combines the transformation elements in a feedforward network of nodes to form layers in a layered network architecture. Typically, each transformation element in one layer provides outputs to all the transformation elements in the next layer. Each transformation element in the next layer then processes the inputs received from all of the transformation elements in the previous layer, for example, by summing the inputs, and transforming the sum by the non-linear transfer function to produce outputs, which are then provided as inputs to the transformation elements in the next layer.

As described in more detail for the constrained training stage 104, the weighted input coefficients and weighted output coefficients are paired to insure monotonicity in the outputs of each transformation element compared to the inputs, with the result that the global behavior of the non-linear network model 42 is constrained to a monotonic behavior. Such monotonic behavior is either a monotonically increasing behavior or monotonically decreasing behavior, depending on the shape of the initial model 40 based on the general behavior of the empirical process being modeled. In an approach of the invention referred to as "complementary pairing," the weighted input coefficient(s) and the weighted output coefficient(s) for each transformation element are paired, so that all outputs have the same sign (negative or positive) as the inputs. For example, if all of the inputs to a transformation element are positive, then the complementary pairing approach insures that all of the outputs of that transformation element are also positive.

The non-linear network model 42 constructed in stage 102 may be a neural network, but is not required by the invention to be a neural network. In general, conventional neural networks are universal approximators that may not perform predictably in areas of missing or sparse model input data 28, whereas the non-linear network model 42 of the invention is used to develop a constrained non-linear approximator in stage 104 that provides a reliable global behavior, such as increasing monotonicity, in regions of missing or sparse model input data 28 used in the constrained training stage 104.

In another embodiment, the base non-linear function is one suitable for use in providing a bounded derivative, and the bounded derivative of the base non-linear function is used to provide constraints during the constrained training stage 104, as will be discussed for that stage 104. Examples of the base non-linear function are functions based on the hyperbolic tangent, the sigmoidal function, and the log of a hyperbolic cosine function.

As described above, in a preferred embodiment, each transformation element in the layered network architecture for the non-linear network model 42 includes a non-linear transfer function based on the base non-linear function. The process of setting constraints by taking a bounded derivative is described in more detail later. It is to be understood that the transformation elements are not required by the invention to all have the same non-linear transfer function, and different transformation elements may have different non-linear transfer functions, not necessarily based on the base non-linear function determined in stage 100.

Stage 104 is the constrained training stage or paradigm, which optimizes the model coefficients such that the general shape of the I/O mappings that were specified in stage 100 are conserved during the training (i.e., optimizing) of the model. One implementation of the constrained training (i.e., optimizing) stage 104 is shown by the model optimizer 38 in FIG. 1, which produces the optimized model 44 as the result of this stage 104. Stage 104 involves optimizing the non-linear network model 42 based on empirical inputs (e.g., model input 28 or current empirical data input 30) to produce the optimized model 44 by constraining the global behavior of the non-linear network model 42. For stage 104, the model input 28 may represent historical process data, such as the historical data for an industrial process facility (e.g., polymer process facility) or historical data about an economic process (e.g., stock market), or a set of hypothetical model data that represents an empirical process. For stage 104, the empirical data input 30 may represent current empirical data from a currently active empirical process, such as an online industrial process facility or an economic process. In such a case, the optimizer 38 is receiving the empirical data input 30 in an online condition; that is, receiving the empirical data input 30 in real-time or nearly real-time time frame (e.g., allowing for buffering or some other limited delay in receiving the data 30 after it is sensed or recorded from the active empirical process).

In stage 104, the optimizer 38 produces the optimized model 44 by constraining the behavior of the non-linear network model 42 while the model 42 receives the input data 28 or 30 to train the model 42 to conform to the general I/O mapping specified in the initial model 40 and constrained by the constraints set up in stage 102 (e.g., by complementary pairing, by a bounded derivative of the non-linear transfer function, or other constraint approach). In a preferred embodiment, the optimizer 38 constrains the model output 32 to be monotonically increasing based on the constraints as described in stage 102. In alternate embodiments, the optimizer 38 constrains the model output 32 by other criteria.

In general, in the preferred embodiment, the optimizer 38 seeks to optimize the non-linear network model 42 by examining the model error and adjusting the weights of the input and output coefficients for the transformation elements to reduce the model error. The optimizer 38 continually (or frequently) checks the results of the optimization compared to the constraints to insure that any update to the model 42 satisfies the original constraints. If an updated version of the model 42 violates the constraints, the optimizer 38 adjusts the coefficients in a different direction (e.g., increases a coefficient value if it was previously decreased) in an attempt to bring the non-linear network model 42 within the constraints as part of the process of modifying the model 42 to become the optimized model 44.

Stage 106 is the model deployment, which involves the deployment of the optimized model 44 in an empirical situation, such as controlling an industrial process, or predicting an economic process (e.g., stock market).

One implementation of the model deployment stage 106 is shown in FIG. 1 by the controller 26, which functions to control an empirical process (e.g., polymer process) based on the optimized model 44 through the controller output 46 produced by the controller 26. In this stage 106, the controller 26 (or forecaster) receives empirical data input 30 from sensors that monitor the inputs and states of different aspects of an industrial process. The optimized model 44 processes the inputs and provides controller output 46 that is used to control the industrial process. For example, in a polymer process, the optimized model 44 adjusts the flow of a chemical into the process by electronically adjusting the setting on an input valve that controls the flow of that chemical.

In another implementation, the optimized model 44 is deployed as a predictor, as in a financial forecaster that serves to predict a financial process, such as the stock market. The financial forecaster may also serve as a financial controller 26 that requests financial actions based on the optimized model 44 of the financial process, such as requesting the purchase or sale of stock.

The controller 26 of stage 106 that is gain scheduled with the optimized model 44 (i.e., constrained non-linear approximator) is a more robust controller than one that is gain scheduled with a universal approximator, and the controller 26 behaves in a predictable manner over the entire operating range of the process.

Stage 108 is the hybrid modeling stage, which involves the inclusion or addition of other model structures (other than the initial model 40, the non-linear network model 42, and the optimized model 44), which may be used to influence the constrained training stage 104 or affect the model deployment stage 106.

In one approach, the other model structure is an advisory model that is used to advise, refine, or influence the training of the non-linear network model 42 in the constrained training stage 104. For example, the advisory model is a first principles model, such as a first principles model of a chemical (e.g., polymer) process.

By allowing for use of other models, the approach of the invention provides for a more precise prediction of both inferred properties and their derivatives by using a combination of engineering knowledge, first principles models, regression based models, and the constrained non-linear approximator described herein or part thereof.

In another approach, the other model provided in stage 108 is a greater or overall model that models a greater or overall empirical process. In this approach, the optimized model 44 is one part or aspect of the greater model, or the optimized model 44 represents one step or procedure in the greater process. For example, in a polymer process, the optimized model 44 may be a model for one component of the overall polymer process, such as a reactor. The optimized model 44 may also be considered a child of a parent that models the greater empirical process. Generally, the optimized model 44 may be included in or associated with a greater model, or provide input to the greater model, as well as advise, influence, or direct such a greater model. Furthermore, any of the other models 40 and 42 of the invention may be used with a greater model, and any of the components (i.e., initial model creator 34, model constructor 36, and optimizer 38) of the invention may be used with, associated with, included in, or provide input to a greater model, in a manner similar to what has been described for the optimized model 44 above.

Stage 110 is the constrained on-line model adaptation, involving the fine tuning or correcting of an optimized model 44 that has been deployed in the model deployment stage 106. Such fine tuning or adaptation of the optimized model 44 may be required if the controller 26 receives input for some new region of data that was not represented (or sparsely represented) by the model input 28 used to train the non-linear network model 42 in stage 104 to produce the optimized model 44. For example, the optimized model 44 (i.e., constrained non-linear approximator) provides output that is generally monotonically increasing in the new region, but may require further optimization to obtain an improved result. In addition, such adaptation may be required if the performance of the optimized model 44 as deployed in the controller 26 has deteriorated or has not met original expectations.

In stage 110, the optimizer 38 checks the results of the on-line optimization compared to the constraints to insure that any update to the optimized model 44 satisfies the original constraints. If an updated version of the optimized model 44 violates the constraints, the optimizer 38 adjusts the coefficients in a different direction (e.g., increases a coefficient value if it was previously decreased) in an attempt to bring the model 44 within the constraints. In general, the process of constrained online model adaptation in stage 110 is similar to the process of constrained training in stage 104.

The modular nature of this invention means that each stage 100, 102 and 104 may be implemented independently of the others. As an example, the training algorithm described in stage 104 may be applied to a multilayer-perceptron neural network in order to restrict the function such that certain input/output relationships are monotonically constrained over their entire input domain.

The invention allows each input/output relationship to be treated in isolation. Hence, some input/output relationships may be left unconstrained and thus allow them to have complete universal approximating capability. Other input/output relationships may be constrained to be monotonic and others may be given a general gain trajectory shape to adhere to.

The invention encompasses both steady state and dynamic modeling architectures that may be used for both gain scheduling and non-linear programs in steady state optimizers.

Mathematical Foundations of the Invention

The following sections describe the mathematical foundations of the inventions. The headings are not meant to be limiting. A topic indicated in a heading may also be discussed elsewhere herein.

These following sections describe one implementation of the non-linear network model 42 described earlier for FIGS. 1 and 2.

General Structure

The monotonicity conditions are imposed on the non-linear network model 42 both through architecture (stage 102) and through constraining the training algorithm (stage 104). The following sections first define the calculations for a general, feedforward neural network (herein "neural net") since it is clearer to describe first and second derivative calculations in general form. Later sections then look at the specific means of imposing monotonicity.

Notation

A general feedforward neural net consists of an ordered set of L layers. The position of each processing element (PE) in a layer is represented by a subscript—i, j, k, 1, m, and n are used as PE indices. The processing element is one example of the transformation element described for stage 102 of FIG. 2. Each PE has a summation value $x_i$, and an output value $y_i$, a transfer function $f_i$ relating $x_i$ to $y_i$. Processing elements in different layers are distinguished if necessary by a superscript in parentheses—p, q, r, and s are used as layer indices. Weights between PE's are notated as $w_{ij}^{(p,q)}$ which represents the connection weight from $y_j^{(q)}$ to $x_i^{(p)}$, q<p.

Note that this allows for several layers to feed a given layer; bias is readily dealt with in this structure by specifying it as a single element layer with its summation value $x_j=1$, and a linear transfer function.

Data Scaling

Neural nets require data to be scale to normalized units. Typically, this is done by a linear mapping that transforms the training and test data to 0 mean and standard deviation of 1.

Feedforward Equations $$x_i^{(1)} \text{ data input} \tag{1}$$

↓:

$$y_i^{(p-1)} = f_i^{(p-1)}(x_i^{(p-1)})$$

$$x_i^{(p)} = \sum_{q<p}\sum_j w_{ij}^{(p,q)} y_j^{(r)}$$

Objective Function

A set of measured data points is used for training the neural net (one example of the non-linear network model 42). This consists of a set of measured inputs and corresponding measured outputs (an example of the model input 28 used in training the non-linear network model 42 in stage 104 of FIG. 2). The neural net tries to recreate this mapping between measured inputs and measured outputs, so that outputs can be estimated in the absence of measurements. This training is achieved by constructing an objective function that is a measure of goodness of fit. However, the data also contains noise and spurious relationships, so the objective function also contains a term to inhibit complexity in the mapping.

Notationally:

$$J = J_D(\{y_i^{(L)}\}) + J_W(\{w_{ij}^{(p,q)}\}) \tag{2}$$

$J_D$ is the measure of how well the neural net fits the data and is a function of a data set, and indirectly, of the weights. $J_W$ is the regularization term which inhibits overfitting and is a direct function of the weights.

Derivatives

The derivative calculation in a feedforward neural net is referred to as back-propagation since it calculates derivatives of the objective with respect to the weights by propagating the derivative of the objective with respect to the outputs back through the network. This makes use of a chain rule that in the neural net world is attributed to Werbos. See Paul John Werbos, "The Roots of Backpropagation: From Ordered Derivatives to Neural Networks and Political Forecasting (Adaptive and learning systems for signal processing)", January, 1994.

$$D_J y_i^{(L)} = \partial J / \partial y_i^{(L)} \tag{3}$$

↓:

$$D_J x_i^{(p)} = f_i'(x_i^{(p)}) D_J y_i^{(p)}$$

$$D_J y_i^{(p-1)} = \sum_{q \geq p} \sum_j w_{ji}^{(q,p-1)} D_J x_j^{(q)}$$

↓:

Then calculate the weight gradient as:

$$D_J w_{ij}^{(p,q)} = y_j^{(q)} D_J x_i^{(p)} \quad q<p \tag{4}$$

Second Derivatives

Some optimizers (e.g., optimizer 38), make use of Hessian information. It turns out that Hessian information can be calculated analytically in a general feedforward neural net by passing information forwards and backwards through the network. The idea is to consider each of the derivatives from the previous section as appending the original set of variables (x's, y's, and w's). Then use Werbos's chain rule to calculate the second derivatives. For each weight $W_{mn}^{(r,s)}$, let $\Im \equiv D_J W_{mn}^{(r,s)}$ be considered as the new objective. The goal is to calculate $D_\Im(w_{ij}^{(p,q)})$. Then perform a forward and backward pass through the network, starting at the given weight's destination layer, and ending at the given weight's source layer:

$$D_\Im (D_J y_i^{(p)}) = 0 \quad p<r \tag{5}$$

-continued $$D_{\Im}(D_J x_i^{(r)}) = \delta_{mi} y_n^{(s)}$$

↓:

$$D_{\Im} D_J y_i^{(p-1)} = f_i'(x_i^{(p-1)}) D_{\Im}(D_J x_i^{(p-1)})$$

$$D_{\Im}(D_J x_i^{(p)}) = \sum_{q \geq r, q < p} \sum_j w_{ij}^{(p,q)} D_{\Im}(D_J y_j^{(q)})$$

↓:

$$D_{\Im}(y_i^{(L)}) = (\partial^2 J / \partial (y_i^{(L)})^2) D_{\Im}(D_J y_i^{(L)})$$

↓:

$$D_{\Im}(x_i^{(p)}) = f_i'(x_i^{(p)}) D_{\Im}(y_i^{(p)}) + f_i''(x_i^{(p)}) D_J y_i^{(p)} D_{\Im}(D_J x_i^{(p)})$$

$$D_{\Im}(y_i^{(p-1)}) = \sum_{q \geq p} \sum_j w_{ji}^{(q,p-1)} D_{\Im}(x_j^{(q)})$$

↓:

$$D_{\Im}(y_i^{(s)}) = \delta_{ni} D_J x_m^{(r)} + \sum_{q > s} \sum_j w_{ji}^{(q,s)} D_{\Im}(x_j^{(q)})$$

Then calculate the Hessian with respect to the weights using the formula:

$$\frac{\partial^2 J}{\partial w_{mn}^{(r,s)} \partial w_{ij}^{(p,q)}} \equiv D_{\Im}(w_{ij}^{(p)}) = y_j^{(q)} D_{\Im}(x_i^{(p)}) + D_J x_i^{(p)} D_{\Im}(D_J y_j^{(q)}) \quad (6)$$

$$p \geq r, q \geq s$$

Note that the forward and backward pass through the network must be performed for each weight for which a $2^{nd}$ order derivative is required. However, once this has been done, any of the second derivatives involving that weight can be easily calculated with two multiplications and an addition.

The summations, outputs, and back-propagated information from the original forward and backward pass (used to calculate the objective and the gradient) must be maintained during these Hessian passes, since the formulas make use of them. In addition, a Hessian forward and backward pass differs from the original as follows:

i. Feed $D_{\Im}(D_J x_i^{(r)})$ as the input (i.e. summation value) to the $r^{th}$ layer.
ii. In the feedforward pass
   (a) The source layers below the $p^{th}$ layer are initialized to have output 0
   (b) the original transfer function at each node gets replaced by a scalar multiplication by the original $f_k'(x_k^{(m)})$.
iii. Calculate the value to feedback by multiplying the output from the feedforward pass by the Hessian of the original objective function J with respect to the original outputs. For standard RMS error based objectives, this Hessian is just a constant times the identity matrix
iv. In the back-propagation pass:
   (a) Propagate back to the weights source layer only.
   (b) There is now also a second derivative term for $D\Im(x_i^{(p)})$ which is multiplied by the saved output from feed-forward step.
   (c) The derivative $D\Im(y_n^{(s)})$ has an extra term $D_J x_m^{(r)}$ representing its direct influence on $\Im$.

Conventional Training

Conventional training algorithms for a standard feed forward apply an unconstrained optimizer to minimize the objective function. Typically the only decision variables are the weights. The objective and its derivatives and second derivatives with respect to the weights are calculated using the above formulas.

Transfer Functions

For demonstration purposes, three transfer functions are described for use in a preferred embodiment of the present invention. The transfer functions for the invention described herein are not limited to these three examples. In different embodiments, the invention can utilize any non-linear transformation and still produce an enhanced model architecture (e.g. non-linear network model 42) for use in model based control and optimization schemes. The activation or other transformation may actually be a single input/single output neural (or other non-linear) network which could be trained on a user defined input/output or gain trajectory mapping (e.g. initial model 40). It is the constrained optimization (e.g. constrained training stage 104 of FIG. 2) that generates the robustness properties desirable in advanced control and optimization schemes. The sample transfer functions are: tanh, sigmoid and asymmetric Bounded Derivative (ABD). Their formulas, derivatives, and second derivatives are as follows:

Tanh $$y = \tan h(x)$$

$$y' = 1 - y^2$$

$$y'' = -2 \cdot y \cdot y' \quad (7)$$

Sigmoid $$y = 0.5(\tan h(x) + 1)$$

$$y' = y - y^2$$

$$y'' = (1 - 2y) \cdot y' \quad (8)$$

ABD $$y = \alpha \cdot x + \beta \cdot \ln(\cos h(x))$$

$$y' = \alpha + \beta \cdot \tan h(x)$$

$$y'' = \beta \cdot (1 - \tan h^2(x)) \quad (9)$$

The ABD transfer function used in a preferred embodiment of the invention is monotonic positive under the following conditions:

$$\beta \geq 0, \alpha - \beta > 0$$

or $$\beta \leq 0, \alpha + \beta > 0 \quad (10)$$

Other advantages of the ABD formulation (equations at (9)) are that the input/output relationship does not saturate at the extremes of the data. It is actually the derivative ($y' = \alpha + \beta \cdot \tan h(x)$) of the function ($y = \alpha \cdot x + \beta \cdot \ln(\cos h(x))$) that saturates, which yields linear models in regions of extrapolation (e.g., when entering regions of data that were missing or sparsely covered in the training data, such as model input 28).

Monotonic Neural Net Structure

The following sections describe examples for setting up constraints for a non-linear network model 42 in a preferred embodiment of the invention. The constraining conditions for monotonicity are described (but not limited to) the following:

Complementarity Conditions

The three sample transfer functions (equations 7, 8 and 9) described for this invention are monotonic transformations. The sigmoidal activation and hyperbolic tangent are also rotationally symmetric, i.e.

$$\tan h(x) = -\tan h(-x) \quad (11)$$

The law of superposition allows that if two positively monotonic functions are added together then the resulting transformation is also positively monotonic. Similarly, if two negatively monotonic functions are added together, the resulting transformation is negatively monotonic.

The output node of the non-linear network model 42 is essentially a linear summation of monotonic transformations. Hence, provided the sign of the coefficient which maps an input variable to a hidden node and the sign of the coefficient connecting this node to the output layer are complementary to the desired direction of monotonicity (for all hidden nodes) then the overall monotonicity of the input/output relationship is conserved.

Example of Setting Complementarity Conditions

If the desired input/output relationship is required to be positively monotonic. Then for a non-linear network model 42 with four hidden nodes with output weights signs (+,−,+,−) respectively, then the corresponding coefficients mapping this input to each hidden node should be (+,−,+,−) respectively. Two negatively signed coefficients in series produce a positively monotonic transformation as described in equation (11). Although the ABD transformation does not obey the rotational symmetry described in equation (11), the function −ABD(−x) is positively monotonic and so still produces an overall positive input/output monotonicity. The same logic applies for negative monotonic transformations.

The following sections provide two examples of constrained non-linear approximators (CNA) architecture suitable for use in developing examples of the non-linear network model 42 of stage 102 of FIG. 2. The first example illustrates a 6-layer non-linear layered network CNA architecture and the second example illustrates a 5-layer non-linear layered network CNA architecture. The use of the phrases "first example" and "second example" is not meant to be limiting in any way.

First Example of CNA Architecture (for Six Layers)

Figure 3:
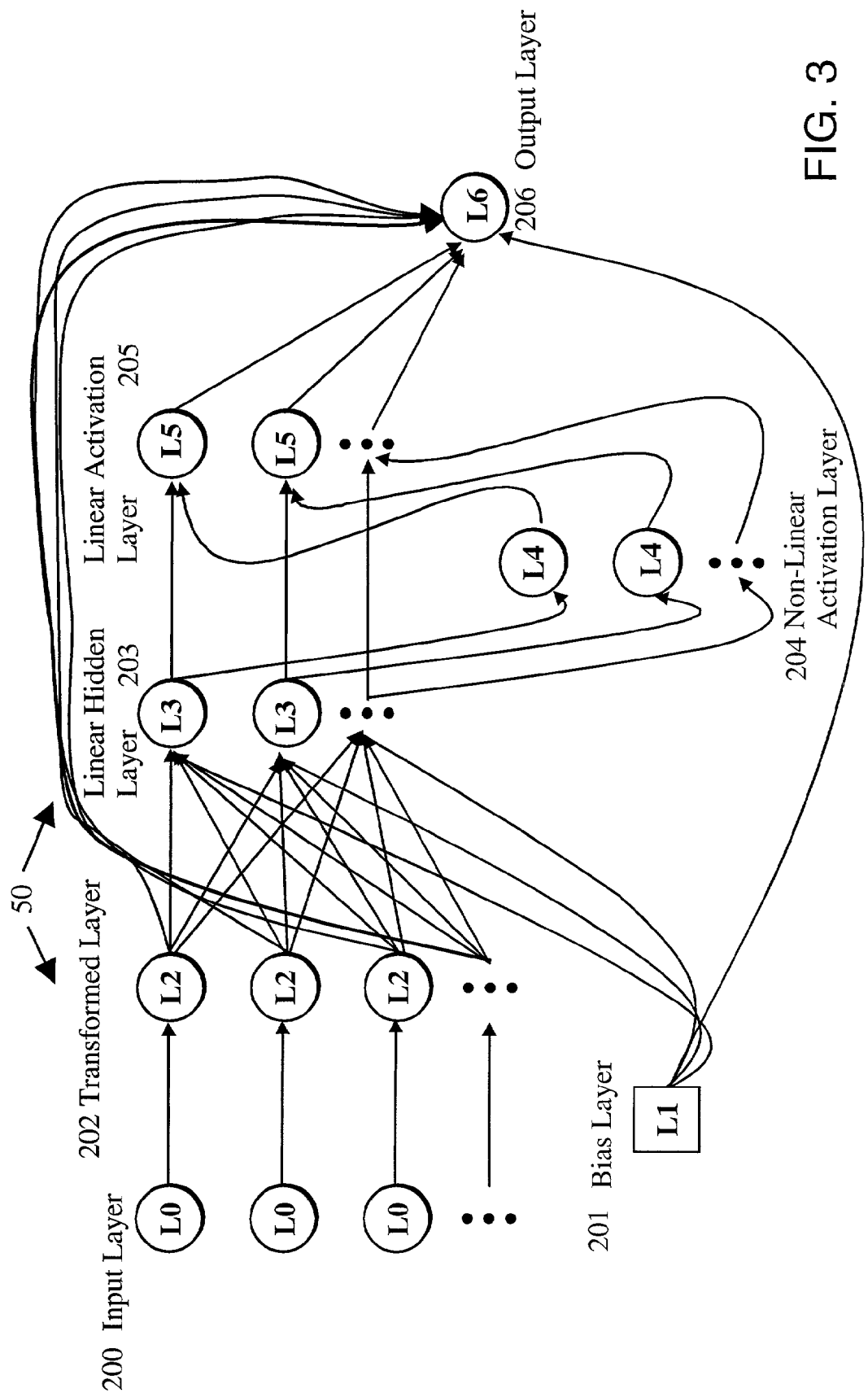
FIG. 3 is an example of a constrained non-linear approximator architectural specification.

FIG. 3 is an example of a 6-layer constrained non-linear approximator (CNA) architectural specification for an example of a non-linear network, which may be used as the basis for on example of a non-linear network model 42. The actual architecture detailed in this diagram is the integral of a non-linear network where the non-linear hidden layer contains a summation followed by an ABD (e.g., ln(cos h(x))) transformation and where the integral of the non-linear network is considered equivalent to the non-linear network model 42. Although any layer architecture may be used in this invention, in the preferred embodiment the non-linear network integral is used, one example of which is the neural network integral. As previously discussed, conventional neural networks (e.g., used in universal approximators) are good at predicting input/output relationships but are poor predictors of derivatives. Hence, fitting a non-linear network integral to input/output data means that the non-linear network (i.e. the derivative of the non-linear network model 42) is the underlying architecture that is fitting the derivative of the relationship in the training data. This therefore forms a solution to the problem of generating robust, non-linear empirical models (e.g. non-linear network model 42) with well behaved derivatives. The examples of CNA architecture described here work well in closed loop control schemes such as chemical process industrial production facilities. In addition, because with this CNA architecture it is the model derivative (e.g. derivative of an optimized model 44 based on a non-linear network model 42) that saturates (not the actual input/output relationship), the models (e.g. optimized models 44) smoothly converge to linear models in regions of extrapolation.

Referring to FIG. 3, the non-linear network 50 includes an input layer 200, bias layer 201, transformed layer 202, linear hidden layer 203, non-linear activation layer 204, linear activation 205 and output layer 206. The input layer 200 includes one or more elements L0; the bias layer 201 includes one or more elements L1; the transformed layer 202 includes one or more elements L2; the linear hidden layer 203 includes one or more elements L3; the non-linear activation layer 204 includes one or more elements L4; the linear activation layer 205 includes one or more elements L5; and the output layer 206 includes one or more elements L6.

The training data (e.g. model input 28) is presented to the input layer 200. Each node L0 through L6 in the architecture represents a processing element (PE). Each processing element has one or more inputs and one or more outputs. The processing element (e.g., processing elements L3) typically sums any inputs to it and then passes this summation through a transfer function. The transfer function may be non-linear (as in the case of layer 204) or linear (where in effect the summed inputs form the output of the processing element).

Each arrow in FIG. 3 represents a model coefficient (or weighting). The connections (arrows) between the input layer 200 and transformed layer 202 are fixed at a value of 1 (in this example in FIG. 3). This is a transformation layer 202 which allows the direction of the input data to be changed (i.e. switch the coefficients to −1) if necessary.

The bias layer 201 provides a bias term. The connection of this layer 201 to the output layer 206 essentially represents the "constant" term that occurs when integrating a neural network.

Layer 203 is a hidden layer were the inputs are simply added together. No transformation is performed at this layer 203. In a conventional neural network, these summations would then be passed through a sigmoidal (s-shaped) or hyperbolic tangent activation function. In the integral case (i.e., integral approach using the techniques of the invention), the summations from layer 203 are passed through the integral of the hyperbolic tangent (namely integral(q*tan h(v*X))=a*X+b*log(cos h(v*X))+c). This is achieved by layers 204, 205 and 201. Finally, the transformed inputs from layer 205 are connected directly to the output layer 206. This connection represents the integral of the bias term in a conventional neural network.

The layer CNA architecture of FIG. 3 is an example of a non-linear network architecture that may be used in this invention. The example illustrated in FIG. 3 and in a second example described in the following sections may be used in any application of non-linear empirical modeling.

Second Example of CNA Architecture (for Five Layers)

The following sections describe a second example of a CNA architecture suitable for use with the invention.

The monotonic neural net structure described here for the second CNA architecture example consists of five layers.

The five layers include the input layer, bias layer, signed input layer, hidden layer and output layer. The invention is not limited to any specific number of layers. The invention encompasses any such constrained neural architectures which utilize a non-linear constraining optimization algorithm for the purpose of producing well behaved non-linear models for use in model based control and optimization schemes.

The non-standard layer is the Signed Input layer which is used to represent the direction of the non-linearity.

Layer Scheme for Second Example of CNA Architecture

| Layer | # PEs | Transfer Function |
|---|---|---|
| 1. Input | # input variables | Linear |
| 2. Bias | 1 (constant output of 1) | Linear |
| 3. Signed Input | # input variables | Linear |
| 4. Hidden | user selected (default 4) | Hyperbolic Tangent, Sigmoid, or Asymmetric Bounded Derivative |
| 5. Output | 1 | Linear |

Connection Scheme for Second Example of CNA Architecture

The following table shows the connection scheme between layers. A full connection means that every PE in the source layer is connected to every PE in the destination layer. A corresponding connection implies that the source and destination layers have the same number of PEs and each PE in the source layer is connected to the corresponding PE in the destination layer.

| | From: | | | |
|---|---|---|---|---|
| To: | Input | Bias | Signed Input | Hidden |
| Signed Input | Corresponding | | | |
| Hidden | | Full | Full | |
| Output | | Full | | Full |

Specifying Monotonicity for the Second Example of the CNA Architecture

In the approach referred to here as "complementarity pairing," the model designer first is able to specify the monotonicity of each input variable to be one of the following:
Monotonic Positive
Monotonic Negative
Unknown Monotonicity
Non-monotonic Denote the set of indices corresponding to these four options as $I_+$, $I_-$, $I_?$, and $I_{non}$ respectively. Monotonicity is achieved by imposing constraints on the weights of the data paths between the signed input layer (layer 3) and the output PE layer (layer 5). These data paths are indirect via the hidden layer (layer 4). Using the indexing notation described in the section "Notation" herein, the constraints are specified as:

$$C_{ji} = -w_{1j}^{(5,4)} w_{ji}^{(4,3)} < 0, \; i \in I_+ \cup I_- \cup I_? \tag{12}$$

Because the transfer functions at each layer are monotonic positive, each path between the signed input layer and the output PE represents a monotonic positive calculation. It is the job of the weights between the input layer and the signed input layer to provide the direction of the monotonicity.

Constraining the Direction of the Monotonicity for the Second Example of the CNA Architecture If the direction of the monotonicity is specified in advance by the user, then the weight between the input and signed input is constrained to be of that sign. Otherwise there is no constraint put on that weight. Mathematically:

$$w_{ii}^{(3,1)} > 0 \; i \in I_+$$

$$w_{ii}^{(3,1)} < 0 \; i \in T_- \tag{13}$$

Objective Function for the Second Example of the CNA Architecture

Using the notation in section 0:

$$J_D = \frac{1}{2K} \sum_{data\;set} (y_{meas}^{(L)} - y^{(L)})^2 \tag{14}$$

$$J_W = \frac{1}{2} \sum_{p,q=1}^{L} \beta^{(p,q)} \sum_{i,j} (w_{ij}^{(p,q)})^2$$

where $\beta^{(p,q)}$ is a tuning parameter. For this implementation, all the $\beta^{(p,q)}$ are user settable as a single Regularization tuning parameter with a small default value, except for $\beta^{(3,1)}$ which is set to 0 so that monotonicity determination is unhindered.

Constraint Derivatives for the Second CNA Architecture

The constraint derivatives have a sparse structure. Each constraint has only 2 non-zero derivatives giving a total of $2 \times H \times N_M$ non-zero constraint derivatives, where H is the number of hidden PEs and $N_M$ is the number of monotonic input variables:

$$\left. \begin{array}{l} \dfrac{\partial C_{ji}}{\partial w_{1j}^{(5,4)}} = -w_{ji}^{(4,3)} \\[6pt] \dfrac{\partial C_{ji}}{\partial_{ji}^{(4,3)}} = -w_{1j}^{(5,4)} \end{array} \right\} i \in I_+ \cup I_- \cup I_? \tag{15}$$

Any suitable constrained non-linear optimizer 38 may now be used to generate the model solution. This completes the discussion of the Second CNA Architecture.

Constraints Based on a Bounded Derivative

In a preferred embodiment of the invention, constraints may be calculated based on an asymmetric bounded derivative. Referring to the example of a non-linear network 50 shown in FIG., 3, the general equation describing one example of the input/output relationship in FIG. 3 is:

Equation (16):

$$y = w_{11}^{(6,1)} + \sum_i w_{1i}^{(6,2)} w_{1i}^{(2,0)} x_i +$$

$$\sum_j w_{1j}^{(6,5)} \left( w_{jj}^{(5,4)} \left( \log \left( \cosh \left( w_{j1}^{(3,1)} + \sum_i w_{ji}^{(3,2)} (w_{ii}^{(2,0)} x_i) \right) \right) \right) \right) +$$

-continued $$w_{jj}^{(5,3)}\left(w_{jj'}^{(3,1)} + \sum_i w_{ji}^{(3,2)}(w_{ii}^{(2,0)}x_i)\right)\right)\right)$$

For the notation, refer to the "Notation" section provided previously herein.

In this example, the logarithm of the hyperbolic cosine has been chosen as the non-linear transfer (activation) function which provides a bounded derivative trajectory (the derivative of the log(cosh( )) function is the bounded hyperbolic tangent).

The derivative of equation 16 can be calculated as:

$$\frac{\partial y}{\partial x_k} = w_{1k}^{(6,2)}w_{kk}^{(2,0)} + \sum_j w_{1j}^{(6,5)}w_{jk}^{(3,2)}w_{kk}^{(2,0)} \quad \text{Equation (17)}$$

$$\left(w_{jj}^{(5,4)}\left(\tanh\left(w_{jj'}^{(3,1)} + \sum_i w_{ji}^{(3,2)}(w_{ii}^{(2,0)}x_i)\right)\right) + w_{jj}^{(5,3)}\right)$$

The theoretical bounds on the above function (equation 17) can be calculated as:

$$\frac{\partial y}{\partial x_{k_{bound(1)}}} = w_{kk}^{(2,0)}\left(\sum_j w_{1j}^{(6,5)}w_{jk}^{(3,2)}w_{jj}^{(5,3)} - \quad \text{Equations (18) and (19)}\right.$$

$$\left.\sum_j |w_{1j}^{(6,5)}w_{jk}^{(3,2)}w_{jj}^{(5,4)}| + w_{1k}^{(6,2)}\right)$$

$$\frac{\partial y}{\partial x_{k_{bound(2)}}} = w_{kk}^{(2,0)}\left(\sum_j w_{1j}^{(6,5)}w_{jk}^{(3,2)}w_{jj}^{(5,3)} + \right.$$

$$\left.\sum_j |w_{1j}^{(6,5)}w_{jk}^{(3,2)}w_{jj}^{(5,4)}| + w_{1k}^{(6,2)}\right)$$

The derivative of equation (16) is guaranteed to globally be within the bounds described by equations (18) and (19) due to the saturation of the hyperbolic tangent function between the above limits.

Which bound is the upper and which is the lower depends on the sign of $w_{kk}^{(2,0)}$.

During training of the model 44, the above bounds can be calculated at each optimization iteration. The derivatives of the above bounds with respect to each coefficient in the model 44 can be calculated and constraints placed on the model 44 based on the above bounds lying within specified limits (e.g. a lower bound of zero and an upper bound of 1e+20 would guarantee that for that input, the input/output relationship would be globally positively monotonic). A lower bound of slightly greater than zero would guarantee global extrapolation capability.

If the inputs to the model 44 described in equation (16) are state vectors from for example a state space model, then the overall steady state gains between the actual model inputs and the output can be constrained by including the steady state contribution of each state variable to the output (for that particular input) as a linear set of weighting factors in equations (18) and (19). Examples of such state space models are provided by assignee Aspen Technology, Inc. of Cambridge, Mass. and are described in commonly assigned U.S. patent application Ser. No. 09/160,128, now U.S. Pat. No. 6,453,308 to Zhao et al. issued on Sep. 17, 2002 and filed Sep. 24, 1998, entitled "Non-linear Dynamic Predictive Device," and U.S. Pat. No. 5,477,444, issued Dec. 19, 1995, entitled "Control System Using an Adaptive Neural Network for a Target and Path Optimization for a Mulitvariate, Nonlinear Process", both of which are incorporated herein by reference.

Functioning of the Constrained Optimizer

This section describes how the optimizer 38 functions in producing the optimized model 44 from the non-linear network model 42.

The optimizer 38 requires an objective function. In this case, the objective function is typically the square of the model error $E=(y-y_{target})^2$. In order to minimize this objective function, the optimizer 38 requires information on how each coefficient of the non-linear network model 42 affects the model error.

$$\left(\text{i.e.} \frac{\partial E}{\partial w}\right).$$

The theory of backpropagation can be used to derive these relationships analytically for a layered network model architecture. This data is refered to as the 'Jacobian' of the non-linear network model 42. The backpropagation theory can be extended to include second derivative information (i.e. the Hessian). Armed with this information, the optimizer 38 can then begin its search to minimize the model error. In a preferred embodiment certain constraints are placed on this optimization. A simple case is the weight pairing constraints for the a 5-layer non-linear network described herein.

A constraint may be formulated as:

$$c_1 = -w_1 w_2 \quad (20)$$

Where the purpose of the constraint is that $c_1$ must always be negative. Hence $w_1$ and $w_2$ then have the same sign (where $w_1$ and $w_2$ are two weights that we may wish to constrain).

Hence, the optimizer 38 continuously calculate the above constraint. If during optimization, the value of $c_1$ (or any of the other constraints) reaches zero or goes positive, then the optimizer 38 shifts from trying to minimize the objective function E and concentrates on getting the constraint calculation back to less than zero. To do this, the optimizer 38 needs to know the derivatives of the constraint with respect to each of the coefficients in the constraint. Hence:

$$\frac{\partial c_1}{\partial w_1} = -w_2 \quad (21)$$

$$\frac{\partial c_1}{\partial w_2} = -w_1 \quad (22)$$

Armed with this information, the optimizer 38 attempts to eliminate the constraint violation. Optimization is terminated when no further reduction in the objective can be achieved.

The pairing constraint (i.e., complementarity pairing) is just one example of how to constrain layered model architectures in order to guarantee a specific type of global behavior (in this case monotonicity). The approach of the invention may be used to constrain these models generally in order to achieve a specific global model behavior (not necessarily monotonicity). For example, the non-linear network integral architecture (or bounded derivative network) has specific bounds on the model derivative that can be calculated by the optimizer 38. Since they can be calculated, they can be constrained as a specific application of the present invention.

Alternative Optimization Strategies

The approaches described so far are examples of the many ways of constraining the neural networks in order to ascertain the salient features of the constrained non-linear approximator of the present invention. Alternative strategies may include (but are not limited to) optimization without analytical derivatives (e.g., finite difference approximation), penalty functions for non-monotonic solutions (e.g. input to hidden weight/hidden to output weight complementarity violations) and constrained optimization of the ABD activation functions where the constraints are the minimum and/or maximum derivative of each activation function and any linear combination thereof.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method for modeling a non-linear empirical industrial process, said method comprising the steps of:
   creating an initial model generally corresponding to the non-linear empirical industrial process to be modeled, the initial model having a base non-linear function, an initial input and an initial output;
   constructing a non-linear network model based on the initial model, the non-linear network model having (a) multiple inputs based on the initial input and (b) a global behavior for the non-linear network model as a whole that conforms generally to the initial output, the global behavior being at least in regions of sparse initial input; and
   calibrating the non-linear network model based on empirical inputs of the non-linear empirical industrial process by using a hound on an analytical derivative of the base non-linear function that allows global properties including at least a global minimum value and a global maximum value of the analytical derivatives to be calculated directly from model coefficients, the global properties used to produce, via a constrained nonlinear optimization method, an analytically constrained model with global behavior, the constrained model enabling precision control of the non-linear empirical industrial process.

2. The method of claim 1, wherein the step of creating the initial model includes specifying a general shape of a gain trajectory for the non-linear empirical industrial process.

3. The method of claim 1, wherein the step of creating the initial model includes specifying a non-linear transfer function suitable for use in approximating the non-linear empirical industrial process.

4. The method of claim 3, wherein the non-linear network includes interconnected transformation elements and the step of constructing the non-linear network includes incorporating the non-linear transfer function into at least one transformation element.

5. The method of claim 4, wherein the step of calibrating the non-linear model includes setting constraints by taking a bounded derivative of the non-liner transfer function.

6. The method of claim 5, wherein the non-linear transfer function includes the log of a hyperbolic cosine function.

7. The method of claim 1, wherein the non-linear network model is based on a layered network architecture having a feedforward network of nodes with input/output relationships to each other, the feedforward network having transformation elements; each transformation element having a non-linear transfer function, a weighted input coefficient and a weighted output coefficient; and the step of calibrating the non-liner network model includes constraining the global behavior of the non-linear network model to a monotonic transformation based on the initial input by pairing the weighted input and output coefficients for each transformation element in a complementary manner to provide the monotonic transformation.

8. The method of claim 1, wherein the step of calibrating the non-linear network model comprises adjusting the calibration based on information provided by an advisory model that represents another model of the non-linear empirical industrial process that is different from the initial model, the non-linear network model, and the constrained model.

9. The method of claim 8, wherein the advisory model is a first principles model of the non-liner empirical industrial process.

10. A computer-implemented method for modeling a non-linear empirical industrial process, and controlling a greater process, said method comprising the steps of:
   creating an initial model generally corresponding to the non-linear empirical industrial process to be modeled, the initial model having a base non-linear function, an initial input and an initial output;
   constructing a non-linear network model based on the initial model, the non-linear network model having (a) multiple inputs based on the initial input and (b) a global behavior for the non-linear network model as a whole that conforms generally to the initial output, the global behavior being at least in regions of sparse initial input; and
   calibrating the non-linear network model based on empirical inputs of the non-linear empirical industrial process by using a bound on an analytical derivative of the base non-linear function that allows global properties including at least a global minimum value and a global maximum value of the analytical derivatives to be calculated directly from model coefficients, the global properties used to produce, via a constrained nonlinear optimization method, an analytically constrained model with global behavior, the constrained model enabling precision control of the non-linear empirical industrial process, the non-linear empirical industrial process being part of the greater process, and deploying the constrained model in a controller that controls the greater process.

11. A computer apparatus for building a model for modeling a non-linear empirical industrial process, comprising:
   a model creator for creating an initial model generally corresponding to the non-linear empirical industrial process to be modeled, the initial model having a base non-linear function, an initial input and an initial output, the global behavior being at least in regions of sparse initial input;
   a model constructor coupled to the model creator for constructing a non-linear network model based on the initial model, the non-linear network model having multiple inputs based on the initial input and a global behavior for the non-linear network model as a whole that conforms generally to the initial output; and a calibrator coupled to the model constructor for calibrating the non-linear network model based on empirical inputs of the non-linear empirical industrial process by using a bound on an analytical derivative of the base non-linear function that allows global properties including at least a global minimum value and a global maximum value of the analytical derivatives to be calculated directly from model coefficients, the global properties used to produce, via a constrained nonlinear optimization method, an analytically constrained model with global behavior, the constrained model enabling precision control of the non-linear empirical industrial process.

12. The computer apparatus of claim 11, wherein the model creator specifies a general shape of a gain trajectory for the non-liner empirical industrial process.

13. The computer apparatus of claim 11, wherein the model creator specifics a non-linear transfer function suitable for use in approximating The non-linear empirical industrial process.

14. The computer apparatus of claim 13, wherein the non-linear network includes interconnected transformation elements and the model constructor incorporates the non-linear transfer function into at least one transformation element.

15. The computer apparatus of claim 14, wherein the calibrator sets constraints by taking a bounded derivative of the non-linear transfer function.

16. The computer apparatus of claim 15, wherein the non-linear transfer function includes the log of a hyperbolic cosine function.

17. The computer apparatus of claim 11, wherein the model constructor constructs the non-linear network model based on a layered network architecture having a feedforward network of nodes with input/output relationships to each other, the feedforward network having transformation elements, each transformation element having a non-linear transfer function, a weighted input coefficient and a weighted output coefficient; and the calibrator constrains the global behavior of the non-linear network model to a monotonic transformation based on the initial input by pairing the weighted input and output caefficients for each transformation element in a complementary manner to provide the monotonic transformation.

18. The computer apparatus of claim 11, further comprising an advisory model that represents another model of the non-linear empirical industrial process that is different from the initial model, the non-linear network model, and the constrained model; and wherein the calibrator adjusts the calibration based on information provided by the advisory model.

19. The computer apparatus of claim 18, wherein the advisory model is a first principles model of the non-linear empirical industrial process.

20. The computer apparatus of claim 11, wherein the non-linear empirical industrial process is pan of a greater process managed by a controller coupled to controller optimizer, and the controller optimizer communicates the constrained model to the controller for deployment in the controller.

21. A computer program product that includes a computer usable medium having computer program instructions stored thereon for building a model for modeling a non-linear empirical industrial process, such that the computer program instructions, when performed by a digital processor, cause the digital processor to:

create an initial model generally corresponding to the non-linear empirical industrial process to be modeled, the initial model having a base non-linear function, an initial input and an initial output;

construct a non-linear network model based on the initial model, the non-linear network model having multiple inputs based on the initial input and a global behavior for the non-linear network model as a whole that conforms generally to the initial output, the global behavior being at least in regions of sparse initial input; and calibrate the non-linear network model based on empirical inputs of the non-linear empirical industrial process by using a bound on an analytical derivative of the base non-linear function that allows global properties including at least a global minimum value and a global maximum value of the analytical derivatives to be calculated directly from model coefficients, the global properties used to produce, via a constrained nonlinear optimization method, an analytically constrained model with global behavior, the constrained model enabling precision control of the non-linear empirical industrial process.

22. A computer-implemented method for building a model for modeling a polymer process, said method comprising the steps of:

specifying a base non-linear function for an initial model generally corresponding to the polymer process to be modeled, the initial model including an initial input and an initial output and the base non-linear function including a log of a hyperbolic cosine function;

constructing a non-linear network model based on the initial model and including the base non-linear function, the non-linear network model having multiple inputs based on the initial input and a global behavior for the non-liner network model as a whole that conforms generally to the initial output; and calibrating the non-liner network model based on empirical inputs of the polymer process by using a bound on a derivative of the base non-liner function to constrain parameters of the model in order to produce a constrained model with global behavior, the constrained model providing optimized approximations to a process controller for controlling the polymer process.

23. A computer apparatus for building a model for modeling a polymer process; comprising:

a model creator for specifying a base non-linear function for an initial model generally corresponding to the polymer process to be modeled, the initial model including an initial input and an initial output and the base non-linear function including a log of a hyperbolic cosine function;

a model constructor coupled to the model creator for constructing a non-linear network model based on the initial model and including the base non-linear function, the non-linear network model having multiple inputs based on the initial input and a global behavior for the non-linear network model as a whole that conforms generally to the initial output; and a calibrator coupled to the model constructor for calibrating the non-linear network model based on empirical inputs of the polymer process by using a bound on a derivative of the base non-linear function to constrain parameters of the model in order to produce a constrained model with global behavior, the constrained model providing optimized approximations to a process controller for controlling the polymer process.

24. A computer program product that includes a computer usable medium having computer program instructions stored thereon for building a model for modeling a polymer process, such that the computer program instructions, when performed by a digital processor, cause the digital processor to:
specify a base non-linear function for an initial model generally corresponding to the polymer process to be modeled, the initial model including an initial input and an initial output and the base non-linear function including a log of a hyperbolic cosine function;
construct a non-linear network model based on the initial model and including the base non-linear function, the non-linear network model having multiple inputs based on the initial input and a global behavior for the non-linear network model as a whole that conforms generally to the initial output; and
calibrate the non-linear network model based on empirical inputs of the polymer process by using a bounded derivative of the base non-linear function to constrain the parameters of the model in order to produce a constrained model with global behavior, the constrained model providing optimized approximations to a process controller for controlling the polymer process.

25. A computer-implemented method for modeling a non-linear empirical industrial process, the method comprising the steps of:
creating an initial model generally corresponding to the non-linear empirical industrial process to be modeled, the initial model having a base non linear function, an initial input and an initial output;
constructing a non-linear network model based on the initial model, the non-linear network model having (a) multiple inputs based on the initial input and (b) a global behavior for the non-linear network model as a whole that conforms generally to the initial output, The global behavior being at least in regions of sparse initial input or in regions of missing initial input; and
calibrating the non-linear network model based on empirical inputs of the non-linear empirical industrial process by using a bound on a derivative of the base non-linear function to constrain parameters of the model to produce a constrained model with global behavior of the non-linear network model, the constrained model enabling precision control of the non-linear empirical industrial process.

26. A computer implemented method for modeling a non-linear empirical industrial process, said method comprising the steps of:
creating an initial model generally corresponding to the non-linear empirical industrial process to be modeled, the initial model having a base non linear function, an initial input and an initial output;
constructing a non-linear network model based on the initial model, the non-linear network model having (a) multiple inputs based on the initial input and (b) a global behavior for the non-linear network model as a whole that conforms generally to the initial output, the global behavior being at least in regions of sparse initial input; and
calibrating the non-linear network model based on empirical inputs of the non-linear empirical industrial process by using a bound on an analytical derivative of the base non-linear function that allows global properties including at least a global minimum value and a global maximum value of the analytical derivatives to be calculated and manipulated directly from model coefficients, the global properties used to produce, via a constrained nonlinear optimization method, an analytically constrained model with global behavior, the constrained model enabling precision control of the non linear empirical industrial process.

27. A computer implemented method for modeling a non-linear empirical industrial process, said method comprising the steps of:
creating an initial model generally corresponding to the non-linear empirical industrial process to be modeled, the initial model having a base non linear function, an initial input and an initial output;
constructing a non-linear network model based on the initial model, the non-linear network model having (a) multiple inputs based on the initial input and (b) a global behavior for the non-linear network model as a whole that conforms generally to the initial output, The global behavior being at least in regions of sparse initial input; and
calibrating the non-linear network model based on empirical inputs of the non-linear empirical industrial process by using a bound on an analytical derivative of the base non-linear function that allows global properties including at least a global minimum value and a global maximum value of the analytical derivatives to be calculated and manipulated directly from model coefficients, the global properties used to produce, via a constrained nonlinear optimization method, an analytically constrained model with global behavior, the constrained model enabling precision control of the non-linear empirical industrial process, and the model coefficients being manipulated by using a modified base non-linear function.

28. A computer implemented method for modeling a non-linear empirical industrial process, said method comprising the steps of:
creating an initial model generally corresponding to the non-linear empirical industrial process to be modeled, the initial model having a base non linear function, an initial input and an initial output;
constructing a non-linear network model based on the initial model, the non-linear network model having (a) multiple inputs based on the initial input and (b) a global behavior for the non-linear network model as a whole that conforms generally to the initial output, the global behavior being at least in regions of sparse initial input; and
calibrating the non-linear network model based on empirical inputs of the non-linear empirical industrial process by using a bound on an analytical derivative of the base non-linear function that allows global properties including at least a global minimum value and a global maximum value of the analytical derivatives to be calculated and manipulated directly from model coefficients, the global properties used to produce, via a constrained nonlinear optimization method, an analytically constrained model with global behavior, the constrained model enabling precision control of the non-linear empirical industrial process, and the model coefficients being manipulated by using a modified base non-linear function that excludes at least one of a hyperbolic tangent function, a radial basis function, and a sigmoid function, the base non-linear function has a global minimum or a global maximum first derivative that is independent of the model coefficients.

29. A computer implemented method for modeling a non-liner empirical industrial process, said method comprising the steps of:
creating an initial model generally corresponding to the non-linear empirical industrial process to be modeled, the initial model having a base non liner function, an initial input and an initial output;
constructing a non-linear network model based on the initial model, the non-linear network model having (a) multiple inputs based on the initial input and (b) a global behavior for the non-linear network model as a whole that conforms generally to the initial output, the global behavior being at least in regions of sparse initial input; and
calibrating the non-linear network model based on empirical inputs of the non-liner empirical industrial process by using a bound on an analytical derivative of the base non-linear function that allows global properties including at least a global minimum value and a global maximum value of the analytical derivatives to be calculated and manipulated directly from model coefficients, the global properties used to produce, via a constrained nonlinear optimization method, an analytically constrained model with global behavior, the constrained model enabling precision control of the non-linear empirical industrial process, the global maximum and minimum values of the analytical derivatives both being a free function of the model coefficients.

30. The computer implemented method of claim 29, wherein the base nonlinear function excludes at least one of a hyperbolic tangent function, a radial basis function, a sigmoid function, and wherein a global minimum or a global maximum first derivative is independent of the model coefficients.

* * * * *

UNITED STATES PATENT AND TRADEMARK OFFICE
CERTIFICATE OF CORRECTION

PATENT NO. : 7,330,804 B2
APPLICATION NO. : 09/892586
DATED : February 12, 2008
INVENTOR(S) : Paul Turner et al.

It is certified that error appears in the above-identified patent and that said Letters Patent is hereby corrected as shown below:

Claim 1, Col. 23, Line 46,
please delete "hound" and insert --bound--

Claim 13, Col. 25, Line 22,
please delete "The" and insert --the--

Claim 17, Col. 25, Line 46,
please delete "caefficients" and insert --coefficients--

Claim 20, Col. 25, Line 60,
please delete "pan" and insert --part--

Signed and Sealed this

Third Day of June, 2008

JON W. DUDAS
*Director of the United States Patent and Trademark Office*